United States Patent
Visco et al.

[11] Patent Number: 6,025,094
[45] Date of Patent: *Feb. 15, 2000

[54] PROTECTIVE COATINGS FOR NEGATIVE ELECTRODES

[75] Inventors: Steven J. Visco, Berkeley; May-Ying Chu, Oakland, both of Calif.

[73] Assignee: PolyPlus Battery Company, Inc., Berkeley, Calif.

[*] Notice: This patent is subject to a terminal disclaimer.

[21] Appl. No.: 09/086,665

[22] Filed: May 29, 1998

Related U.S. Application Data

[63] Continuation-in-part of application No. 08/814,927, Mar. 11, 1997, Pat. No. 5,789,108, which is a continuation-in-part of application No. 08/686,609, Jul. 26, 1996, Pat. No. 5,686,201, which is a continuation-in-part of application No. 08/479,687, Jun. 7, 1995, Pat. No. 5,582,623, which is a continuation-in-part of application No. 08/344,384, Nov. 23, 1994, Pat. No. 5,523,179.

[51] Int. Cl.$^7$ .................................................... H01M 4/58
[52] U.S. Cl. ................... 429/231.95; 429/231.9; 429/104; 429/105; 429/218.1; 429/300; 429/303; 429/338; 427/78; 427/126.2; 427/126.3; 427/255.2; 427/255.7
[58] Field of Search ............................ 429/231.9, 231.95, 429/246, 104, 218.1, 300, 338, 303, 105; 427/78, 126.2, 126.3, 255.2, 255.7

[56] References Cited

U.S. PATENT DOCUMENTS

| | | | |
|---|---|---|---|
| 5,314,765 | 5/1994 | Bates | 429/194 |
| 5,338,625 | 8/1994 | Bates et al. | 429/193 |
| 5,455,126 | 10/1995 | Bates et al. | 429/127 |
| 5,512,147 | 4/1996 | Bates et al. | 204/192.15 |
| 5,538,814 | 7/1996 | Kamauchi et al. | 429/218 |
| 5,567,210 | 10/1996 | Bates et al. | 29/623.5 |
| 5,569,520 | 10/1996 | Bates | 429/162 |
| 5,597,660 | 1/1997 | Bates et al. | 429/191 |
| 5,612,152 | 3/1997 | Bates et al. | 429/152 |
| 5,686,201 | 11/1997 | Chu | 429/59 |
| 5,814,420 | 9/1998 | Chu | 429/104 |
| 5,824,434 | 10/1998 | Kawakami et al. | 429/209 |

OTHER PUBLICATIONS

"R&D Thin–Film Technology," Sep., 1997, *R&D Magazine*.
Steven D. Jones, et al., "Thin Film Rechargeable Li Batteries," Ohio/New Jersey, 1994, *Solid States Ionics* no month available.
J.B. Bates, et al., "Thin–Film Rechargeable Lithium Batteries," Tennessee, *Journal of Power Sources* no month/yr available.
N.J. Dudney, et al., "Sputtering of Lithium Compounds for Preparation of Electrolyte Thin Films," 1992, Tennessee, *Solid State Ionics* no month available.
J.B. Bates, et al., "Electrical Properties of Amorphous Lithium Electrolyte Thin Films," 1992, Tennessee, *Solid State Ionics* no month available.
Xiaohua Yu, et al., "A Stable Thin–Film Lithium Electrolyte: Lithium Phosphorus Oxynitride," Feb. 1997, Tennessee, The Electrochemical Society, Inc.

*Primary Examiner*—Bruce F. Bell
*Attorney, Agent, or Firm*—Beyer & Weaver, LLP

[57] ABSTRACT

Disclosed is an alkali metal negative electrode having a protective layer. Specifically, the disclosed negative electrode includes a glassy or amorphous surface protective layer which conducts alkali metal ions but effectively blocks the alkali metal in the electrode from direct contact with the ambient. The protective layer has improved smoothness and reduced internal stress in comparison to prior protective layers such as those formed by sputtering. In a specific embodiment, the protective layer is formed on the lithium metal electrode surface by a plasma assisted deposition technique.

38 Claims, 6 Drawing Sheets

PROTECTIVE COATINGS FOR NEGATIVE ELECTRODES

CROSS-REFERENCE TO RELATED APPLICATIONS

This application is a continuation-in-part of U.S. patent application Ser. No. 08/814,927, (now U.S. Pat. No. 5,789, 108) filed Mar. 11, 1997 and entitled RECHARGEABLE POSITIVE ELECTRODES which is a continuation of U.S. patent application Ser. No. 08/686,609 (now U.S. Pat. No. 5,686,201, issued Nov. 11, 1997), filed Jul. 26, 1996, and entitled RECHARGEABLE POSITIVE ELECTRODES, which is a continuation-in-part of U.S. patent application Ser. No. 08/479,687 (now U.S. Pat. No. 5,582,623, issued Dec. 10, 1996, filed Jun. 7, 1995, and entitled METHODS OF FABRICATING RECHARGEABLE POSITIVE ELECTRODES) which is, in turn, a continuation-in-part of U.S. patent application Ser. No. 08/344,384 (now U.S. Pat. No. 5,523,179, issued Jun. 4, 1996, filed Nov. 23, 1994, and entitled RECHARGEABLE POSITIVE ELECTRODE). U.S. patent application Ser. No. 08/686,609 is incorporated herein by reference for all purposes. In addition, both U.S. Pat. Nos. 5,582,623 and 5,523,179 are incorporated herein by reference for all purposes.

BACKGROUND OF THE INVENTION

This invention relates to negative electrodes for use in batteries (e.g., lithium electrodes for use in lithium-sulfur batteries). More particularly, this invention relates to alkali metal electrodes having a thin glassy or amorphous protective layer.

The rapid proliferation of portable electronic devices in the international marketplace has led to a corresponding increase in the demand for advanced secondary batteries (i.e., rechargeable batteries). The miniaturization of such devices as, for example, cellular phones, laptop computers, etc., has naturally fueled the desire for rechargeable batteries having high specific energies (light weight). At the same time, mounting concerns regarding the environmental impact of throwaway technologies, has caused a discernible shift away from primary batteries and towards rechargeable systems.

Among the factors leading to the successful development of high specific energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-explosive, non-toxic, and easy to process.

In theory, some alkali metals could provide very high energy density batteries. The low equivalent weight of lithium renders it particularly attractive as a battery electrode component. Lithium also provides greater energy per volume than does the traditional battery standards, nickel and cadmium. Unfortunately, no rechargeable lithium metal batteries have yet succeeded in the market place.

The failure of rechargeable lithium metal batteries is due in large measure to cell cycling problems. To be commercially viable, a lithium battery should recharge at least a hundred times. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address some of the cycling problems observed with lithium metal electrodes, some researchers have developed lithium batteries employing a solid electrolyte, such as an ionically conductive polymer or ceramic. Note that most traditional batteries employ liquid electrolytes. It has been found that systems employing such solid electrolytes reduce the incidence of dendrites and mossy deposits. Unfortunately, solid electrolytes also possess a relatively low ionic conductivity (in comparison to liquid electrolytes), thereby reducing the high rate discharge (high power) performance of the battery.

To address lithium's poor cycling behavior in liquid electrolyte systems, some researchers have proposed that the electrolyte facing side of the lithium negative electrode be coated with a "protective layer." Such protective layer must conduct lithium ions, but at the same time prevent contact between the lithium electrode surface and the bulk electrolyte. Known protective layers all have certain difficulties.

Many lithium metal protective layers contemplated to date form in situ by reaction between lithium metal and compounds in the cell's electrolyte which contact the lithium. Most of these in situ films are grown by a controlled chemical reaction after the battery is assembled. Generally, such films are of poor quality, having a porous morphology allowing some electrolyte to penetrate to the bare lithium metal surface.

Some research has focused on "nitridation" of the lithium metal surface as a means for protecting lithium electrodes. In such process, a bare lithium metal electrode surface is reacted with a nitrogen plasma to form a surface layer of polycrystalline lithium nitride ($Li_3N$). This nitride layer conducts lithium ions and at least partially protects the bulk lithium of the negative electrode from a liquid electrolyte. A process for nitriding lithium battery electrodes it is described in R&D Magazine, September 1997, p 65 (describing the work of S. A. Anders, M. Dickinson, and M. Rubin at Lawrence Berkeley National Laboratory). Unfortunately, lithium nitride layers suffer from various problems. First, the grain boundaries between crystallites in a lithium nitride layer offer pathways for electrolyte to find its way to the bulk lithium electrode. In addition, lithium nitride decomposes when exposed to moisture. While lithium metal batteries employ nonaqueous electrolytes, it is very difficult to remove all traces of moisture from the electrolyte. Thus, trace moisture will ultimately compromise the protective properties of the lithium nitride. Still further, lithium nitride has a very low voltage window. That is, it is stable over only very limited potential differences. Specifically, when exposed to a potential difference of greater than about 0.45V, it oxidizes. This makes it unsuitable for applications where it may be exposed to higher potential differences, as when the lithium electrode becomes highly polarized.

Other pre-formed lithium protective layers have been contemplated. Most notably, U.S. Pat. No. 5,314,765 (issued to Bates on May 24, 1994) describes a lithium electrode containing a thin layer of sputtered lithium phosphorus oxynitride ("LiPON") or related material. LiPON is a glassy single ion (lithium ion) conductor which has been studied as a potential electrolyte for solid state lithium microbatteries that are fabricated on silicon and used to power integrated circuits (See U.S. Pat. Nos. 5,597,660, 5,567,210, 5,338, 625, and 5,512,147, all issued to Bates et al.). Unfortunately, sputtering is a cold process and so the sputtered LiPON layer may frequently be porous and have columnar structures, limiting its usefulness in protecting lithium.

Lithium battery technology still lacks an effective mechanism for protecting lithium negative electrodes from degradation during extended cell cycling. Thus, before lithium metal batteries become commercially viable, such protective mechanism must be developed.

SUMMARY OF THE INVENTION

This invention provides an alkali metal negative electrode having an improved protective layer. Specifically, the negative electrode includes a glassy or amorphous surface protective layer which conducts alkali metal ions but effectively blocks the alkali metal in the electrode from direct contact with the ambient. The protective layer has improved smoothness and reduced internal stress in comparison to prior protective layers such as those formed by sputtering. In a specific embodiment, the protective layer is formed on the lithium metal electrode surface by a plasma assisted deposition technique.

The negative electrodes of this invention resist formation of dendrites or mossy deposits on cycling and so they will typically provide rechargeable cells having a relatively long cycle life. In addition, because they are protected by an impermeable protective layer, they may be handled in the atmosphere without the need for a vacuum box or dry box during cell fabrication or other processing.

One aspect of the invention provides a negative electrode that may be characterized as including the following features: (a) an alkali metal layer having a first surface and (b) a glassy or amorphous protective layer coating the first surface and forming a substantially impervious layer which protects the alkali metal. To be useful in a battery, the protective layer should conduct alkali metal ions. In one embodiment, protective layer has a surface roughness of no greater than about 500 angstroms r.m.s. deviation. In another embodiment, the protective layer has a variable composition which gradually varies from a first composition to a second composition over a distance of about 50 angstroms in the direction from the first surface of the alkaline metal to an opposite surface on the protective layer. For example, the protective layer may include a variable concentration of lithium nitride, in which the concentration of lithium nitride is greater at the first surface of the alkali metal than at the opposite surface of the protective layer.

In one format, the negative electrode also includes an electronically conductive backing intimately contacting a second surface of the alkali metal which is opposite the first surface of the alkali metal. This may function as a current collector when assembled in a battery. Examples of suitable alkali metals for the electrode include lithium, sodium, alloys of lithium, and alloys of sodium. Examples of suitable protective layer materials for the electrode include a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide. Specific examples of protective layer materials include $6LiI$—$Li_3PO_4$—$P_2S_5$, $B_2O_3$—$LiCO_3$—$Li_3PO_4$, $LiI$—$Li_2O$—$SiO_2$, and $Li_xPO_yN_z$.

In one preferred embodiment, the protective layer has a thickness of between about 50 angstroms and 3000 angstroms, and more preferably between about 500 angstroms and 2000 angstroms. The protective layer preferably has a conductivity of between about $10^{-8}$ and about $10^{-2}$ $(ohm-cm)^{-1}$.

The present invention also relates to negative electrodes having an alkaline metal and a glassy amorphous protective layer coating in which the electrodes are fabricated by a process including the following sequence: (a) introducing the alkali metal into a reaction chamber; (b) introducing precursors of the protective layer into the reaction chamber; (c) generating a plasma with the precursors; and (d) conducting a reaction involving the precursors to form the glassy amorphous layer on the alkali metal. Generally, the precursors of the protective layer will include the alkali metal or a compound of the alkali metal in a vapor state. The alkali metal may be introduced into the reaction chamber by heating a source of the alkali metal or a compound containing the alkali metal to vaporize the alkali metal or the compound containing the alkali metal. Alternatively, the alkali metal may be introduced into the reaction chamber by contacting a source of the alkali metal (e.g., an alloy of the alkali metal such as a lithium-aluminum alloy) with the plasma to thereby directly introduce the alkali metal into the plasma. Examples of the precursors of the protective layer include an organosilicon compound, an organoboron compound, and an organophosphorus compound.

In a specific embodiment, the invention provides metal-sulfur batteries in which the negative electrode is a metal having a protective layer. The batteries of this embodiment may be characterized by the following features: (a) a positive electrode that includes a mixture of (i) a sulfur-based electrochemically active material, and (ii) an electronically conductive material, (b) a current collector electrically connected to the positive electrode; (c) a negative electrode including (i) a metal or metal ion, and (ii) a protective layer on an electrolyte facing surface of the negative electrode; and (d) an electrolyte separator. Preferably, the electrochemically active material includes elemental sulfur, sulfides of the metal, polysulfides of the metal, or a combination thereof. The positive electrode mixture should have between about 10% and about 100% of the electrochemically active material accessible to electrons and ionic charge carriers. Preferably the utilization of electrochemically active material is at least about 20% and more preferably at least about 40%.

As with the above-described negative electrode, the alkali metal preferably includes at least one of lithium, sodium, alloys of lithium, and alloys of sodium. The protective layer may include at least one of a lithium silicate, a lithium borate, a lithium aluminate, a lithium phosphate, a lithium phosphor nitride, a lithium silicosulfide, a lithium borosulfide, a lithium aluminosulfide, and a lithium phosphosulfide. Preferably, it has a thickness of between about 50 angstroms and 3000 angstroms.

These and other features of the invention will be further described and exemplified in the drawings and detailed description below.

DETAILED DESCRIPTION OF THE PREFERRED EMBODIMENTS

General Electrode Structure

In accordance with the present invention, the surface of a metallic negative electrode is modified to include a protective layer on the electrolyte side. This protective layer should be conductive to lithium ions and help prevent the formation of lithium dendrites or "mossy" lithium on repeated cycling. More preferably, the protective layer is pre-formed (prior to battery fabrication) from an inert physical barrier conductive to the metal ions from the negative electrode. In the description that follows, the invention is described in terms of certain specific compositions, configurations, and processes to help explain how it may be practiced. The invention is not limited to these specific embodiments.

Figure 1:
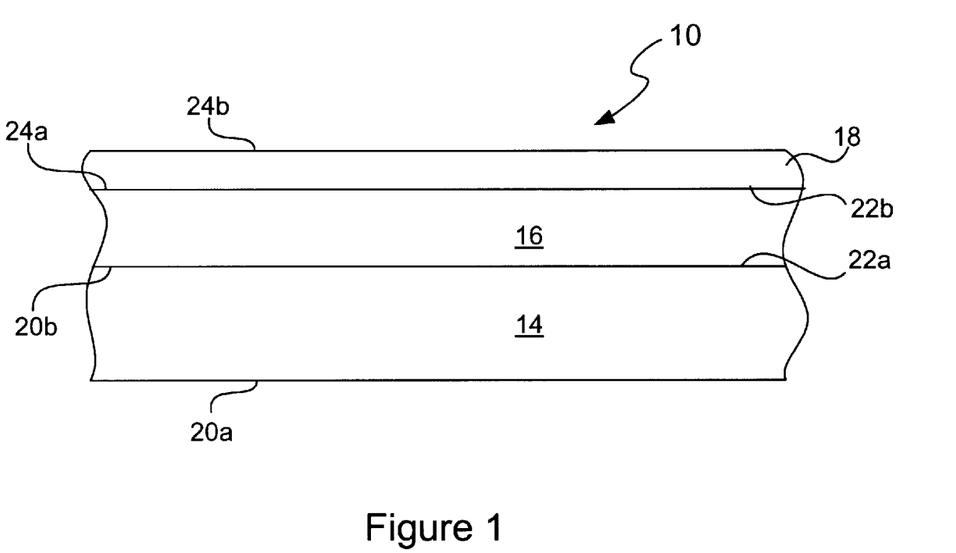
FIG. 1 is a block diagram of a lithium/liquid electrolyte/sulfur cell of this invention.

FIG. 1 illustrates a negative electrode 10 of this invention. Shown in cross-section, negative electrode 10 includes three components; a backing layer 14, a metal layer 16 and a protective layer 18. The backing layer 14 includes a first surface 20A which is exposed to the ambient and a second surface 20B which intimately contacts the metal layer 16. Backing layer 14 will typically serve as a current collector. Metal layer 16 includes a first surface 22A which forms the interface with backing layer 14. It also includes a second surface 22B which intimately contacts protective layer 18. In turn, protective layer 18 includes a first surface 24A which contacts second surface 22B of metal layer 16. Finally, protective layer 18 includes a second surface 22B which is exposed to the ambient. The interfaces at surfaces 22A and 22B of metal layer 16 should be sufficiently continuous or intimate that moisture, air, electrolyte, and other agents from the ambient are prevented from contacting alkali metal 16. In addition, the interface at first surface 22A should provide a low resistance electronic contact between backing layer 14 and metal layer 16.

In accordance with this invention, protective layer 18 is a metal containing glass or amorphous material that conducts ions of the metal in layer 16. For example, if metal layer 16 is a lithium layer, then protective layer 18 should conduct lithium ions. In addition, layer 18 should be substantially impervious to agents from the ambient. Thus, it should be substantially free of pores, defects, and any pathways allowing air, moisture, electrolyte, and other outside agents from penetrating though it to metal layer 16. In this regard, the composition, thickness, and method of fabrication may all be important in imparting the necessary protective properties to layer 18. These features of the protective layer will be described in further detail below.

Preferably, protective layer 18 is so impervious to ambient moisture, carbon dioxide, oxygen, etc. that an alkali metal negative electrode can be handled under ambient conditions without the need for elaborate dry box conditions as typically employed to process other alkali metal electrodes. Because the protective layer described herein provides such good protection for the reactive alkali metal (assuming that metal layer 16 is an alkali metal), it is contemplated that electrode 10 may have a quite long shelf life outside of a battery. Thus, the invention contemplates not only batteries containing negative electrode 10, but unused negative electrodes themselves. Such negative electrodes may be provided in the form of sheets, rolls, stacks, etc. Ultimately, they are integrated with other battery components to fabricate a battery. The enhanced stability of the batteries of this invention will greatly simplify this fabrication procedure.

Amorphous or glassy materials do not posses the grain boundaries that are present in crystalline materials. Such grain boundaries are discontinuities which potentially provide a pathway to the underlying alkali metal through active material. Many compositions can exist as either amorphous/glassy or polycrystalline layers depending on the deposition technique employed. The process parameters that favor one morphology over the other are well known for deposition techniques. Chemical vapor deposition generally favors deposition of a glassy or amorphous layer.

Backing layer 14 is provided on the side of negative electrode 10 which faces away from the electrolyte. It should be electronically conductive and unreactive to moisture, gases in the atmosphere (e.g., oxygen and carbon dioxide), electrolytes and other agents it is likely to encounter prior to, during, and after fabrication of a battery. In addition, backing material 14 should be compatible with the metal in layer 16 at potentials encountered in the battery. In this regard, the material in backing layer 18 should not easily migrate into or otherwise detrimentally effect the electrochemical properties of metal layer 16. Examples of suitable materials for backing layer 14 include foils or other thin metal layers of copper, stainless steel, nickel, zinc, chromium, and compatible alloys thereof. In addition, such metals may be provided as metallization layers on plastics such as polyethylene terephthalate (PET), polypropylene, polyethylene, polyvinylchloride (PVC), polyolefins, polyimides, etc.

In an alternative embodiment, conductive backing layer 14 is replaced with a nonelectronically conductive outer layer such as a second protective layer. In this embodiment, a current collector or terminal must still be affixed to the alkali metal electrode. This may take the form of a metal tab or other electronically conductive member that extends beyond the protective layers.

Most generally, metal layer 16 can comprise any metal, any mixture of metal capable of functioning as a negative electrode. However, the protective layers of this invention will find most use in protecting highly reactive metals such as alkali metals and alkaline earth metals.

In one preferred embodiment, the materials for the negative electrodes include a metal such lithium or sodium or an alloy of one of these with one or more additional alkali metals and/or alkaline earth metals. Preferred alloys include lithium aluminum alloys, lithium silicon alloys, lithium tin alloys, and sodium lead alloys (e.g., $Na_4Pb$). Other metallic electrodes may include alkaline earth electrodes such as magnesium and their alloys; transition metal electrodes such as aluminum, zinc, and lead and their alloys.

As indicated above, protective layer 18 should form a continuous and intimate interface with metal layer 16 to protect it from various agents in the environment. Unfortunately, most alkali metals are so reactive that very soon after they are produced in pure form, their surfaces react with any moisture, oxygen, and carbon dioxide in the environment. Even when handled in a dry box, lithium typically develops a thin layer of oxide, hydroxide, carbonate, etc. Unfortunately, such materials may hamper formation of a highly protective glass surface layer. As will be explained in more detail below, preferred processes of this invention form protective layers directly on alkali metal surfaces immediately after the metal layer is itself formed— possibly in a single vacuum chamber.

Protective Layer Composition

In addition to providing protection, the protective layer should conduct ions generated during discharge of the negative electrode. Thus, protective layer 18 is preferably composed of a glass or amorphous material that is conductive to alkali metal ions of the alkali metal comprising layer 16. Preferably, protective layer 18 does not conduct anions such as $S_8^-$ generated on discharge of a sulfur electrode, or anions present in the electrolyte such as perchlorate from dissociation of lithium perchlorate.

In order to provide the needed ionic conductivity, the protective layer typically contains a mobile ion such as an alkali metal cation of the negative electrode metal. Many suitable single ion conductors are known. Among the suitable glasses are those that may be characterized as containing a "modifier" portion and a "network former" portion. The modifier is often an oxide of the alkali metal in layer 16 (i.e., the metal ion to which protective layer 18 is conductive). The network former is often a polymeric oxide or sulfide. One example is the lithium silicate glass $2\,Li_2O.1\,SiO_2$ and another example is the sodium borosilicate glass $2\,Na_2O.1\,SiO_2.2B_2O_3$.

The modifier/network former glasses employed in this invention may have the general formula $(M_2O).X(A_nD_m)$, where M is an alkali metal, A is boron, aluminum, silicon, or phosphorous, D is oxygen or sulfur. The values of n and m are dependent upon the valence on A. X is a coefficient that varies depending upon the desired properties of the glass. Generally, the conductivity of the glass increases as the value of X decreases. However, if the value of X becomes too small, separate phases of the modifier and network former arise. Generally, the glass should remain of a single phase, so the value of X must be carefully chosen.

The highest concentration of $M_2O$ should be that which yields the stoichiometry of the fully ionic salt of the network former. For instance $SiO_2$ is a polymeric covalent material; as $Li_2O$ is added to silica O—O bonds are broken yielding Si—O $Li^+$. The limit of $Li_2O$ addition is at the completely ionic stoichiometry, which for silica would be $Li_4SiO_4$, or $Li_2O.SiO_2$ ($Li_2O.0.5SiO_2$). Any addition of $Li_2O$ beyond this stoichiometry would necessarily lead to phase separation of $Li_2O$ and $Li_4SiO_4$. Phase separation of a glass composition typically happens well before the fully ionic composition, but this is dependent on the thermal history of the glass and cannot be calculated from stoichiometry. Therefore the ionic limit can be seen as an upper maximum beyond which phase separation will happen regardless of thermal history. The same limitation can be calculated for all network formers, i.e. $Li_3BO_3$ or $3\,Li_2O.B_2O_3$, $Li_3AlO_3$ or $3\,Li_2O.Al_2O_3$, etc. Obviously, the optimum values of X will vary depending upon the modifier and network former employed.

Examples of the modifier include lithium oxide ($Li_2O$), lithium sulfide ($Li_2S$), lithium selenide ($Li_2Se$), sodium oxide ($Na_2O$), sodium sulfide ($Na_2S$), sodium selenide ($Na_2Se$), potassium oxide ($K_2O$), potassium sulfide ($K_2S$), potassium selenide ($K_2Se$), etc., and combinations thereof. Examples of the network former include silicon dioxide ($SiO_2$), silicon sulfide ($SiS_2$), silicon selenide ($SiSe_2$), boron oxide ($B_2O_3$), boron sulfide ($B_2S_3$), boron selenide ($B_2Se_3$), aluminum oxide ($Al_2O_3$), aluminum sulfide ($Al_2S_3$), aluminum selenide ($Al_2Se_3$), phosphorous pentoxide ($P_2O_5$), phosphorous pentasulfide ($P_2S_5$), phosphorous pentaselenide ($P_2Se_5$), phosphorous tetraoxide ($PO_4$), phosphorous tetrasulfide ($PS_4$), phosphorous tetraselenide ($PSe_4$), and related network formers.

"Doped" versions of the above two-part protective glasses may also be employed. Often the dopant is a simple halide of the ion to which the glass is conductive. Examples include lithium iodide (LiI), lithium chloride (LiCl), lithium bromide (LiBr), sodium iodide (NaI), sodium chloride (NaCl), sodium bromide (NaBr), etc. Such doped glasses may have general formula $(M_2O).X(A_nD_m).Y(MH)$ where Y is a coefficient and MH is a metal halide.

The addition of metal halides to glasses is quite different than the addition of metal oxides or network modifiers to glasses. In the case of network modifier addition, the covalent nature of the glass is reduced with increasing modifier addition and the glass becomes more ionic in nature. The addition of metal halides is understood more in terms of the addition of a salt (MH) to a solvent (the modifier/former glass). The solubility of a metal halide (MH) in a glass will also depend on the thermal history of the glass. In general it has been found that the ionic conductivity of a glass increases with increasing dopant (MH) concentration until the point of phase separation. However, very high concentrations of MH dopant may render the glass hygroscopic and susceptible to attack by residual water in battery electrolytes, therefore it might be desirable to use a graded interface where the halide concentration decreases as a function of distance from the negative electrode surface. One suitable halide doped glass is $Li_2O.YLiCl.XB_2O_3.ZSiO_2$.

Some other single ion conductor glasses may also be employed as a protective layer used with this invention. One example is a lithium phosphorus oxynitride glass referred to as LiPON which is described in "A Stable Thin-Film Lithium Electrolyte: Lithium Phosphorus Oxynitride," J. Electrochem. Soc., 144, 524 (1997) and is incorporated herein by reference for all purposes. An example composition for LiPON is $Li_{2.9}PO_{3.3}N_{0.5}$. Examples of other glass films that may work include $6LiI—Li_3PO_4—P_2S_5$ and $B_2O_3—LiCO_3—Li_3PO_4$.

Graded Composition in the Protective Layer

In some cases, it will be desirable to have a graded composition or stoichiometry across the depth of the protective layer (i.e., in the direction between an inner surface 24a and an outer surface 24b). In one embodiment, the protective layer consists of a first compound or stoichiometry at a surface 24a and a second compound or stoichiometry at surface 24b. This approach may take advantage of the fact that some protective layer compositions may provide very high ionic conductivity but poor resistance to environmental agents. Thus, a protective layer may include an inner or bulk region having a high conductivity and an outer or surface region having strong resistance to air, electrolytes, and other environmental agents. As will be explained in more detail below, such graded compositions can be formed by controlling the composition of precursors in a plasma deposition reaction chamber.

In one specific embodiment, the alkali metal stoichiometry varies across the protective layer. The composition may have the highest concentration of alkali metal ions (and hence the highest conductivity) at or near the interface of the protective layer and the alkali metal layer. Moving outward from this inner region, the concentration of alkali metal ion decreases to reach a minimum at or near the outer surface of the protective layer. While this region of lower alkali metal ion concentration may have a lower conductivity than the inner region, it will often be better at resisting attack by a battery's electrolyte.

In another example, the inner or bulk region of the protective layer has a relatively high concentration of nitrogen, possibly even existing as lithium nitride at or near first surface 24a. The composition will contain lower percentage of nitrogen near second surface 24b. As mentioned above, lithium nitride is known to be a good ionic conductor but a poor protector of the alkali metal. To remedy this difficulty, the second or outer surface 24b of protective layer 18 may include lithium silicate or lithium borate with little or no nitrogen content. The outer layer may be very thin (on the order of a few angstroms); just enough to effectively cap the more sensitive lithium nitride or other bulk compound. In one specific example, the inner portion of the protective layer contains lithium nitride. As the layer grows outward, the nitride gives way to a borosilicate glass and finally to a silicate glass at the layer's surface. Other examples of graded structures are those where close to the lithium metal electrode surface of the composition is high in LiI or $Li_3P$ (these compounds may react or dissolve in the battery solvent if not capped) followed by a solid electrolyte layer graded in the concentration of these materials as a function of distance from the electrode surface.

Composite protective layers as described may have very abrupt changes in composition or more gradual changes in composition. With a deposition process such as plasma assisted chemical vapor deposition (CVD), it is a rather simple matter to control the composition. In essence, the composition or stoichiometry can be "dialed in" by controlling the flow rates and/or concentrations of various precursor compounds provided to the reactor. If the change in the composition of the protective layer precursor gases changes very rapidly, then the composition of the resulting protective layer will have a very abrupt change in composition. If, on the other hand, the compositional change in the reactant gases takes place over a relatively long time, the resulting protective layer will have a more gradual change in composition.

Other deposition techniques such as sputtering or evaporation may be more difficult to control thereby requiring more abrupt compositional changes. In many cases, a gradual change in composition is more desirable because it produces a more physically homogeneous layer and therefore reduces internal stresses. It can also greatly reduce the chance of delamination that can occur at well-defined interfaces.

Preferably, the change in composition is relatively gradual in order provide a more robust film having a relatively low level of internal stress. In one specific embodiment, the composition varies from a first composition to a second composition (e.g., from $Li_3N$ to lithium borate) over a distance of at least about 50 angstroms in the direction from inner surface 24a to outer surface 24b. More preferably, the composition variation occurs over a distance of at least about 100 angstroms, and most preferably over a distance of at least about 200 angstroms. In some preferred embodiments, the gradient may be continuous from one composition to the next over the entire thickness of the film.

Thickness and Conductivity of the Protective Layer

Regardless of the chemical composition of protective layer 18, it will generally be desirable that it possess certain physical properties. Physical properties of interest include thickness, ionic conductivity, adhesiveness to the metal, voltage window, etc.

Regarding thickness, protective layer 18 should be as thin as possible while still effectively protecting the metal electrode. Thinner layers have various benefits. Among these are flexibility and low electrical resistance. If a layer becomes too thick, the electrode cannot bend easily without cracking or otherwise damaging the protective layer. Also, the overall resistance of the protective layer is a function of thickness. However, the protective layer should be sufficiently thick to prevent electrolyte or certain aggressive ions from contacting the underlying alkali metal. The appropriate thickness will depend upon the deposition process. If the deposition process produces a high quality protective layer, then a rather thin layer can be employed. A high quality protective layer will be smooth and continuous and free of pores or defects that could provide a pathway from outer surface 24B to inner surface 24A. As explained below, plasma assisted chemical vapor deposition is a preferred fabrication technology for generating high quality protective layers.

For many protective layers, the optimal thickness will range between about 50 angstroms and 3,000 angstroms. More preferably, the thickness will range between about 500 angstroms and 2,000 angstroms. For many high quality protective layers, an optimal thickness will be approximately 1,000 angstroms.

The conductivity of the protective layer to ions of the alkali metal in layer 16 should be fairly high. This is so the protective layer does not rob the cell of power by imparting a large ohmic drop. To this end, the protective layer should be made relatively thin as explained above. In addition, however, the composition of the protective layer should have an inherently high conductivity (e.g., between about $10^{-8}$ and about $10^{-2}$ $(ohm-cm)^{-1}$). Obviously, if a relatively good quality thin layer can be deposited, a material with a relatively low conductivity may be suitable. However, if relatively thicker layers are required to provide adequate protection, it will be imperative that the composition of the protective layer have a relatively high conductivity.

Many nonaqueous rechargeable battery chemistries operate at current densities below 5 $mA/cm^2$. In order to ensure high battery operating voltage during discharge resistive losses across the glassy film should also be minimized. The resistive loss across a conductive film can be calculated according to Ohm's Law V=IR. To ensure that voltage drop across the thin film is less than 100 mV at 5 $mA/cm^2$, the resistance of the film should be less than 20 $\Omega cm^2$. For a 1000 angstrom thick film the maximum resistivity of the film is then calculated as R=ρl/A, ρ=R A/l or ρ=20 (1)/0.00001 cm=$2 \times 10^6$ $\Omega cm$. Therefore the conductivity of the film is preferably greater than $5 \times 10^{-7}$ siemens/cm.

Roughness and Internal Stress of Protective Layer

Preferably, the protective layers of this invention are relatively smooth and free of defects. As pointed out above, protective layers deposited by sputtering typically have unacceptable roughness due to columnar growths and high porosities. This limits their usefulness in very thin layer batteries due to non-uniform current distribution and other problems. Smooth surfaces are superior because most pathways from the alkali metal to the electrolyte are of approximately the same distance. Therefore, the current distribution is more likely to remain relatively uniform, thereby reducing the likelihood that certain regions of the electrode will be rapidly depleted of alkali metal.

In one embodiment, suitably smooth layers of this invention are produced by a plasma assisted deposition technique of the type discussed below. In comparison to sputtering processes, chemical vapor deposition processes produce much smoother and therefore more desirable protective layers. Regardless of how they are formed, the protective layers of this invention preferably have surface roughness of no more than about 500 angstroms r.m.s., more preferably not more than about 100 angstroms r.m.s., and most preferably not more than about 50 angstroms r.m.s.

In addition to the problem of high surface roughness, films deposited by physical vapor deposition (e.g., sputtering) often have high residual stress, limiting their ability to adhere to an underlying alkali metal surface.

Unannealed sputter-deposited films can have residual stresses in excess of 1 GPa (gigapascal) (see, "Polycrystalline ZnO and ZnO:Al layers: dependence of film stress and electrical properties on the energy input during the magnetron sputtering deposition," Ellmer, K., Cebulla, R., and Wendt, R., Materials Research Society Symposium Proceedings (1997), 472 (Polycrystalline Thin films—Structure, texture, Properties, and Applications III), 245–250). Conversely, films fabricated by chemical vapor deposition (CVD) typically have very low residual stress. Films deposited by PECVD often have residual stresses considerably low 1 MPa (megapascal) and in cases have been reported to be near zero (see "Optimization of PECVD SiN films using a statistically designed experiment," Briefly, S. K., Kazior, T. E., Nguyen, L., Materials Research Society Symposium Proceedings (1997) 446 (Amorphous and crystalline Insulating Thin Films—1996), 121–126).

The protective layers of this invention (such as those deposited by a CVD technique) possess relatively low internal stresses, preferably at most about 50 MPa. More preferably films deposited by this technique would have stresses at most about 10 MPa, and even more preferably at most about 1 MPa, and still more preferably at most about 100 kPa.

Plasma Processes for Depositing Protective Layers

As mentioned, the present invention provides protective layers formed by chemical vapor deposition techniques such as plasma enhanced chemical vapor deposition (PE-CVD). Such techniques have significant advantages over the prior art use of sputtering to deposit thin film protective layers. Possibly the biggest advantage PE-CVD has over sputtering is the rate at which films are deposited. PE-CVD can deposit glass films at the rate of 1000 angstroms/min where the sputtering rate is typically on the order of 8 to 10 angstroms/hour. This gives the PE-CVD approach a large economic advantage over sputtering in production.

Plasma enhanced CVD techniques such as "plasma polymerization" techniques are well known in the art and are described generally in the following references which are incorporated herein by reference for all purposes: Characterization of Plasma-enhanced CVD processes: Symposium held Nov. 27–28, 1989, Boston Mass., U.S.A./editors, Gerald Lucovsky, Dale E. Ibbotson, Dennis W. Hess. Pittsburgh, Pa.: Materials Research Society, ©1990; CVD of Nonmetals/edited by William S. Rees. Weinheim; N.Y.: VCH, 1996; and Pierson, Hugh O., Handbook of Chemical Vapor Deposition (CVD): principles, technology, and applications/by Hugh 0. Pierson. Park Ridge, N.J., U.S.A.: Noyes Publications, ©1992. Plasma polymerization is a type of plasma assisted chemical vapor deposition which deposits thin layers of "polymeric" glassy materials from precursors in the reaction chamber. It is well known that such processes may be employed to deposit, for example, thin silicon dioxide films on substrates such as plastic food containers.

In order to deposit a protective layer of a desired composition, it is necessary to introduce the precursors of that composition into the plasma of the reaction chamber. Frequently, this is accomplished by vaporizing a suitably volatile precursor and then carefully controlling the introduction of that precursor into the plasma reaction chamber. For those compositions requiring precursors for which there are no suitably volatile materials available, other delivery mechanisms are required. For example, an electric arc may be directed onto a solid containing the precursor thereby ablating or otherwise removing material from such target in such a manner that it can be introduced into the plasma. Still further, a solid target may be provided proximate the plasma and coupled with it such that the plasma gradually consumes the edge of the target thereby causing the precursor to be introduced into the plasma itself.

In most cases the introduction of the network former ($SiO_2$, $B_2O_3$, $Al_2O_3$, $P_2O_3$, etc.) is easily accomplished through the use of volatile organic compounds such as organosilicon, organoboron, and organophosphorus compounds. Examples of such compounds include tetraethoxysilane, $Si(OC_2H_5)_4$ (TEOS), tributylborate, $B(OC_4H_9)_3$, triethylphosphine oxide, $O=P(C_2H_5)_3$, and trimethyl phosphate, $O=P(OCH_3)_3$.

The introduction of the network modifier, i.e. $Li_2O$, is not as easily accomplished due to the fact that there are very few liquid alkali oxide precursor compounds available for introduction into the plasma. Some alkali metal alkyls such as butyl lithium are liquid at room temperature and could be introduced into the plasma. Such materials must be handled carefully as they are highly pyrophoric and could represent a safety hazard. Since many of the available alkali metal compounds are solid at room temperature, different procedures for introduction into the plasma are necessary. If alkali metal salts are used, a heated vessel can be used whereby the salt is heated to a sufficiently high temperature to yield sufficient vapor pressure and the metal halide vapor is then delivered to the plasma via heated lines. The metal can also be introduced to the plasma by heating the metal in a furnace above its melting point to a temperature sufficiently high to attain a vapor pressure of the metal suitable for plasma deposition. Transport of the metal vapor can be aided by use of an inert gas flowing over the metal melt. Alternatively, a metal alloy can be used whereby the alloy is heated to a temperature sufficiently high to attain a vapor pressure of the metal suitable for plasma deposition. Transport of the metal vapor can be aided by use of an inert gas flowing over the metal melt. Alternatively, a metal alloy can be used whereby the alloy is heated to a temperature at which the vapor pressure of the desired metal is high enough for plasma deposition. For example, if lithium-aluminum alloy is heated to 700° C., the vapor pressure of lithium is about 0.4 torr, while that of aluminum is negligible. By using a metal alloy that is solid at the temperature of use, an annulus could be used with an inert carrier gas flowing through the center of the annulus allowing control of the flux of the metal vapor into the plasma. Alternatively, the alloy annulus could be coupled with the plasma, thereby introducing alkali metal at a temperature controlled by RF coupling of the plasma to the alloy.

Figure 2A:
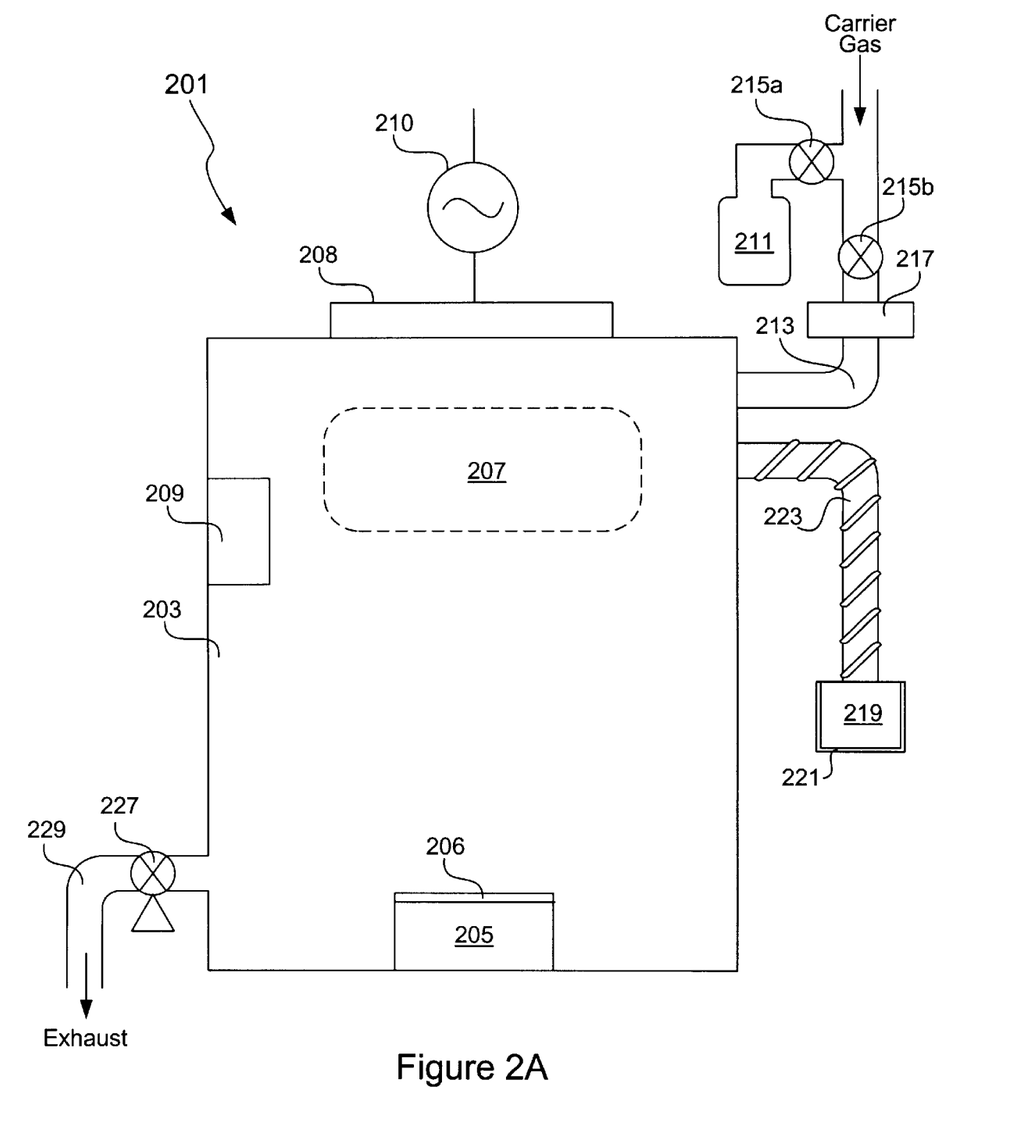
FIG. 2A is a diagram of a chemical vapor deposition reactor system that employs a thermal source of alkali metal to form a thin alkali metal containing protective layer.

FIG. 2A depicts a plasma polymerization reactor 201 that employs a thermal source of alkali metal precursor. Reactor 201 includes a reaction chamber 203 which includes a substrate support 205 and a plasma region 207. A substrate 206 (the alkali metal electrode) resides on support 205 during the plasma deposition process. An electrode 208 provided on reaction chamber 203 and operating under radio frequency power source 210 generates a plasma in region 207. The density of the plasma may be controlled by adjusting the power provided from source 210. A counter electrode may be provided at various locations on or within reactor 201 (e.g., on the sidewalls of chamber 203 or under substrate 205).

Reactor 201 also employs a composition detector 209 such as an emission spectrometer or an x-ray fluorescence detector. Detector 209 is used to monitor the concentration of one or more precursors in plasma region 207. This information may be fed back to control the rates at which the various precursors are introduced into reaction chamber 203.

The precursor for the network former component of the protective layer is stored in a vessel 211. It is drawn into reaction chamber 203 through a flow line 213 under the influence of a vacuum which is maintained within the reaction chamber. The flow rate of the network former precursor is controlled by valves 215a and 215b and monitored by a mass flow meter 217. A carrier gas such as argon or nitrogen is drawn into reaction chamber 203 under the control of valve 215b. It mixes with the network former precursor on the way.

A precursor for the modifier is preferably a suitably volatile salt of the alkali metal such as lithium iodide (LiI) or lithium nitrate ($LiNO_3$). This precursor is housed in a container 219 which is heated by a heat source 221. As the temperature within vessel 219 increases, the vapor pressure of the alkali metal precursor increases and some amount of it is drawn into reaction chamber 203 through a heated conduit 223. The concentration of the alkali metal precursor is monitored by detector 209. To increase the concentration of the alkali metal precursor in plasma region 207, the temperature of vessel 219 is increased. To reduce the concentration, the temperature of vessel 219 is lowered.

A vacuum pump 227 (e.g., a turbomolecular pump) maintains a vacuum in reaction chamber 203. This draws in precursors from lines 213 and 223. Exhaust from reactor 201 flows out an exhaust line 229.

Figure 2B:
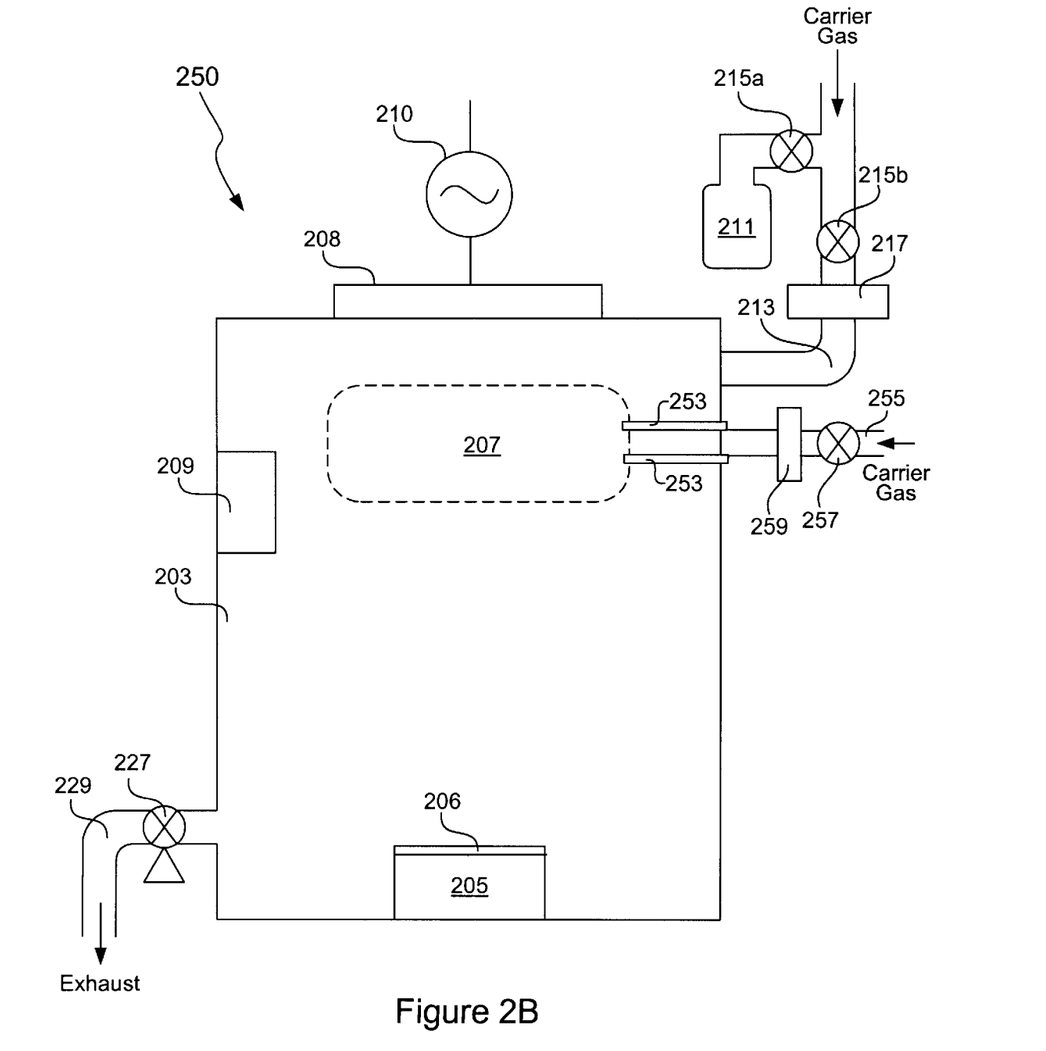
FIG. 2B is a diagram of a chemical vapor deposition reactor system that employs direct introduction of alkali metal into a plasma as a source of alkali metal for forming a thin alkali metal containing protective layer.

FIG. 2B depicts a plasma polymerization reactor 250 which is in many ways similar to reactor 201, but the alkali metal precursor is introduced by an alternative mechanism. In FIGS. 2A and 2B, like features are indicated by like reference numbers. In reactor 250, the alkali metal precursor is introduced by contacting a solid section of the alkali metal or an alloy thereof with plasma region 207. In a preferred embodiment, as shown in FIG. 2B, the solid alkali metal (e.g., lithium or a lithium-aluminum alloy) takes the form of an annular section 253. As mentioned, this material is gradually consumed by the plasma within region 207. In this embodiment, carrier gas is introduced into plasma region 207 by flowing through the interior of the annulus 253. The carrier gas is provided to chamber 203 under the control of a valve 257 as described above and through a conduit 255. A mass flow meter 259 may monitor the flow of carrier gas through annulus 253.

The concentration of alkali metal in the plasma is monitored by detector 209 as explained above. The concentration is controlled by adjusting the radio frequency power employed to generate the plasma within region 207.

Battery Design

Suitable batteries may be constructed according to the known art for assembling cell components and cells as desired, and any of the known configurations may be fabricated utilizing the invention. The exact structures will depend primarily upon the intended use of the battery unit. Examples include thin film with porous separator, thin film polymeric laminate, jelly roll (i.e., spirally wound), prismatic, coin cell, etc.

It should be understood that the negative electrodes of this invention are intended to be used with a separate electrolyte. That electrolyte may be in the liquid, solid (e.g., polymer), or gel state and may be provided together with the negative electrode as a unitary structure (e.g., as a laminate). Such unitary structures will most often employ a solid phase electrolyte. While the protective layer may have a composition and morphology similar to some glassy solid-state electrolytes (such as they employed in solid-state microbatteries), these protective layers are typically too thin to act as an electrolyte in their own rights.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Thereby, reactive elements, such as sodium or lithium in the negative electrode, as well as other cell elements are protected.

Figure 3:
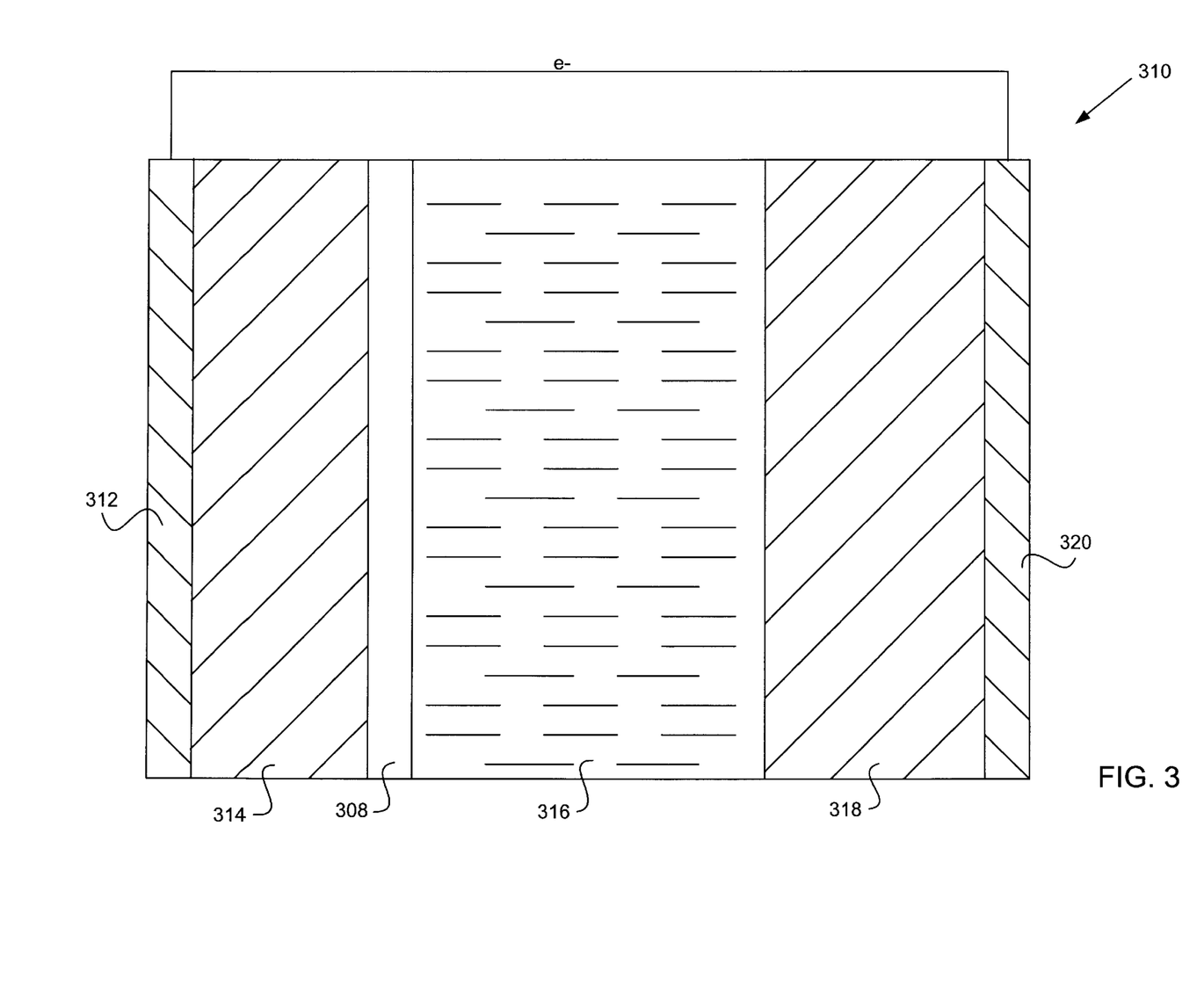
FIG. 3 is a block diagram of a battery formed from an electrode of the present invention.

Referring now to FIG. 3, a cell 310 in accordance with a preferred embodiment of the present invention is shown. Cell 310 includes a negative current collector 312 which is formed of an electronically conductive material. The current collector serves to conduct electrons between a cell terminal (not shown) and a negative electrode 314 (such as lithium) to which current collector 312 is affixed. Negative electrode 314 is made from lithium or other similarly reactive material, and includes a protective layer 308 formed opposite current collector 312. Either negative electrode 314 or protective layer 308 contacts an electrolyte in an electrolyte region 316. As mentioned, the electrolyte may be liquid, gel, or solid (e.g., polymer). To simplify the discussion of FIG. 3, the electrolyte will be referred to as "liquid electrolyte" or just "electrolyte."

Region 316 may be delineated by the boundaries of a separator which prevents electronic contact between the positive and negative electrodes. A positive electrode 318 abuts the side of separator layer 316 opposite negative electrode 314. As electrolyte region 16 is an electronic insulator and ionic conductor, positive electrode 318 is ionically coupled to but electronically insulated from negative electrode 314. Finally, the side of positive electrode 318 opposite electrolyte region 316 is affixed to a positive current collector 320. Current collector 320 provides an electronic connection between a positive cell terminal (not shown) and positive electrode 318.

Current collectors 312 and 320, which provides current connections to the positive and negative electrodes, should resist degradation in the electrochemical environment of the cell and should remain substantially unchanged during discharge and charge. In one embodiment, the current collectors are sheets of conductive material such as aluminum, copper, or stainless steel. The positive electrode may be attached to the current collector by directly forming on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

The separator may occupy all or some part of electrolyte compartment 316. Preferably, it will be a highly porous/permeable material such as a felt, paper, or microporous plastic film. It should also resist attack by the electrolyte and other cell components under the potentials experienced within the cell.. Examples of suitable separators include glass, plastic, ceramic, and porous membranes thereof among other separators known to those in the art. In one specific embodiment, the separator is Celgard 2300 or Celgard 2400 available from Hoechst Celanese of Dallas, Tex.

In some embodiments of the invention, the cell may be characterized as a "thin film" or "thin layer" cell. Such cells possess relatively thin electrodes and electrolyte separators. Preferably, the positive electrode is no thicker than about 300 μm, more preferably no thicker than about 150 μm, and most preferably no thicker than about 100 μm. The negative electrode preferably is no thicker than about 100 μm and more preferably no thicker than about 100 μm. Finally, the electrolyte separator (when in a fully assembled cell) is no thicker than about 100 μm and more preferably no thicker than about 40 μm.

Lithium-Sulfur Batteries

This invention also provides metal-sulfur batteries having a protective layer on the metal electrode as described above. Preferably, the protective layer is pre-formed on the metal electrode surface by a suitable process such as plasma assisted CVD as described above. However, protected metal electrodes employed in the metal-sulfur cells of this invention may be formed by other methods. In one case, the protective layer is formed by an in situ reaction of the metal and an electrolyte additive such as an organosulfur compound, a phosphate, an iodide, a nitride, and a fluoride.

Sulfur positive electrodes and metal-sulfur batteries are described in U.S. Pat. No. 5,686,201 issued to Chu on Nov. 11, 1997 and U.S. patent application Ser. No. 08/948,969 naming Chu et al. as inventors, filed on Oct. 10, 1997. Both of these documents are incorporated herein by reference for all purposes. At a minimum, the sulfur positive electrodes include in their theoretically fully charged state sulfur and an electronically conductive material. At some state of discharge, the positive electrode will include one or more of sulfides and polysulfides, which are sulfides and polysulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode requires only an electronic conductor in addition to the sulfur electroactive material. The electrolyte itself permeates the electrode and acts as the ionic conductor. In the case of a liquid electrolyte cell, the battery design may assume two formats: (1) all active sulfur is dissolved in electrolyte solution (one phase positive electrode) and (2) the active sulfur is distributed between a solid phase (sometimes precipitated) and a liquid phase.

When the metal-sulfur battery cells of this invention include a liquid electrolyte, that electrolyte should keep sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, $LiAsF_6$, as well as, corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator containing less than 20% liquid. Suitable polymeric electrolyte include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator contains at least 20% (weight percentage) of an organic liquid (see the above listed liquid electrolytes for examples), with the liquid being immobilized by the inclusion of a gelling agent. Many gelling agents such as polyacrylonitrile, PVDF, or PEO, can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. As mentioned above, such separators are described in U.S. Pat. No. 3,351,495 assigned to W. R. Grace & Co. and U.S. Pat. Nos. 5,460,904, 5,540,741, and 5,607,485 all assigned to Bellcore, for example.

The electroactive sulfur in the positive electrode may be referred to as "active sulfur" which represents sulfur that is elemental or would be elemental in a theoretically fully charged state of the battery. The sulfur of the positive electrode may be defined another way: at least one of elemental sulfur, a sulfide of the metal from the negative electrodes, and a polysulfide of the metal from the negative electrode. These definitions capture positive electrodes in various states of charge. For example, even if the fully charged cell includes only elemental sulfur, a slightly discharged cell will have some of its elemental sulfur reduced to a metal polysulfide or metal sulfide. Further, the theoretically fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x.

It should be understood that while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

Utilization

In many cases, the battery cells of this invention are rechargeable or secondary cells. Unlike primary cells which discharge only once, the secondary cells of this invention cycle between discharge and charge at least two times. Typically, secondary cells of this invention will cycle at least 50 times, with each cycle having a sulfur utilization (measured as a fraction of 1675 mAh/g sulfur output during the discharge phase of the cycle) of at least about 10%. More preferably, at least 50 cycles will have a minimum sulfur utilization of at least about 20% (most preferably at least about 30%). Alternatively, the secondary cells of this invention will cycle at least two times, with each cycle attaining at least 50% utilization of sulfur in the positive electrode.

As used herein, "utilization" assumes that if all elemental sulfur in an electrode is fully utilized, the electrode will produce 1675 mAh/g of sulfur. That is, 100% utilization corresponds to 1675 mAh/g of the sulfur in the cell, and 10% utilization corresponds to 167.5 mAh/g of sulfur in the cell (a 20% utilization corresponds to 335 mAh/g, a 40% utilization corresponds to 670 mAh/g, a 50% utilization corresponds to 837.5 mAh/g, and a 90% utilization corresponds to 1507.5 mAh/g).

EXAMPLES

Example 1

Silicon oxide $(SiO_x)$ films were prepared on KBr pellets by introduction of an organosilicon compound into a plasma reactor. The plasma reactor included a March Instruments Plasmod 125 Pyrex reaction chamber of 4.1 inch diameter by 5.9 inch long with a 125 watt RF power supply and a pump.

Organosilicon was introduced to the plasma chamber in the form of 1,1,3,3-tetramethyldisiloxane that is a liquid at room temperature. The vapor pressure of the siloxane is sufficient to sustain a silicon flux to the plasma at ambient temperature. A metering valve and mass flow meter in series controlled flux of organosilicon. Films prepared in this way were examined under Fourier Transform Infrared (FTIR) spectroscopy and shown to consist of $SiO_x$.

Example 2

In order to introduce lithium metal into the plasma, a rod of commercial lithium aluminum alloy from Reynolds Aluminum was provided in the plasma reactor. The specific alloy employed was Alcoa alloy CZ50, lot M4728, having the nominal composition 2.13 wt % Li, 2.65 wt % Cu, and the balance aluminum. A 3/16" cube of Li/Al alloy was pounded into the end of a 1/4" stainless steel tube. Then a 0.375 mm hole was drilled through it to form an annulus and the tube was mounted into the reactor (the structure resembled element 253 of FIG. 2b). The exit of the tube was approximately 1.5" from the end of the plasma reactor where the deposition substrates (KBr, glass plates, etc.) were located. A glass holder was then cut so that it fit into the end of the quartz reactor and a microscope slide was mounted onto it (with tape to measure thickness) along with a KBr tube deposition substrate. Deposition onto glass was performed in order to allow measurements of surface roughness with Atomic Force Microscopy (AFM). Deposition onto KBr was performed when FTIR was to be performed. Deposition thickness was determined by peeling away the tape after deposition to provide a step which could be measured.

No plasma could be ignited in the tube so a 5/32" hole was drilled in the tube and samples re-installed in the system. With 7 sccm of argon gas flowing (approximate pressure 0.5 torr) there was immediate ignition in the tube. The optical emission showed a small peak at 670 nm after approximately 15 sec. The peak grew significantly until the spectrometer had to rescale, indicating that lithium was being excited in the plasma state. After 45 seconds the power was shutdown. The tube was glowing red-hot. The system was vented and it was found that the alloy had completely melted inside of the tube indicating that the LiAl alloy temperature had exceeded 600 degrees Centigrade. There was no apparent coating on the samples, possibly because the power in the chamber remained too high.

Example 3

A new inlet was made and installed as described in example 2 above. Ignition was immediate again. This time, the power was controlled to maintain a strong lithium emission but not melt the sample. The experiment lasted 2.5 minutes. Upon venting, a coating on a KBr disk sample turned black indicating the presence of a lithium metal film. After several minutes the black coating turned clear consistent with hydration of a lithium oxide/hydroxide film. The KBr sample was cut and analyzed by FTIR. The FTIR spectrum clearly showed peaks corresponding to $LiO_x$.

Example 4

Introduction of lithium into the plasma was carried out as described in examples 2 and 3. Once a strong lithium signal was established, simultaneous introduction of organosilicon to the plasma was done as described in example 1. Lithium/organosilicon plasma deposition onto KBr disks continued for several minutes at which point the organosilicon and lithium sources were turned off. The lithium source was turned off by simply cutting off RF power to the chamber. Optical profilometry determined film thickness to be close to 1000 angstroms, corresponding to lithium silicate deposition rates of 40 angstrom/sec.

Electron Spectroscopy for Chemical Analysis (ESCA) microprobe depth analysis of surface and bulk composition of the deposited films yielded the following results. The surface of the film is lithium, carbon, and oxygen, with evidence of carbonate formation. In the bulk of the film there is lithium, silicon, oxygen, and carbon. The silicon is a silicate and the carbon is incorporated as a hydrocarbon. Aluminum was not detected in the film.

Figure 4:
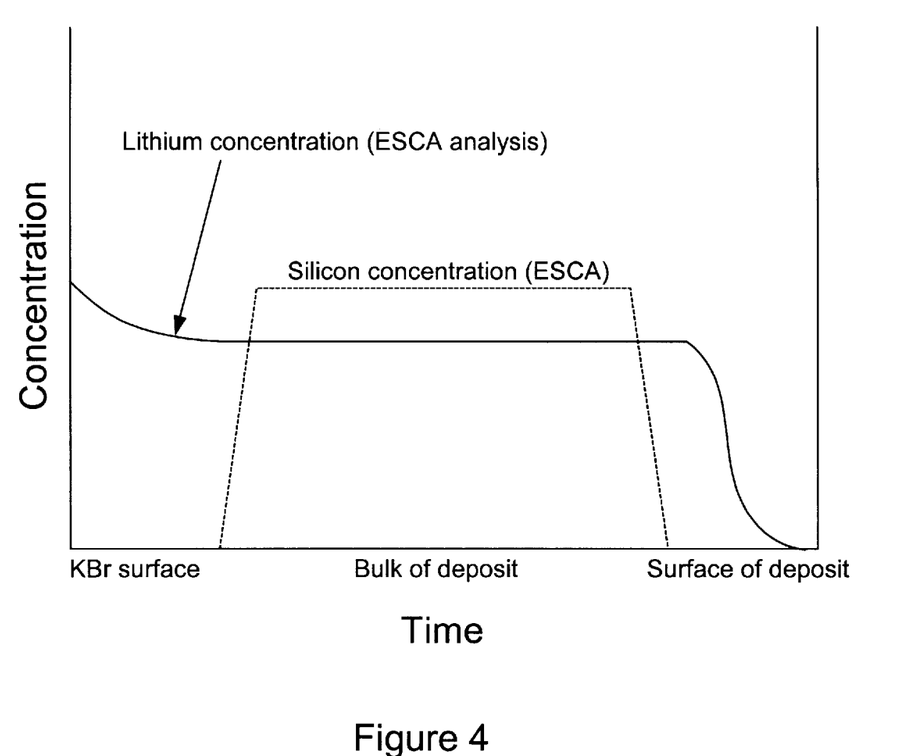
FIG. 4 is a concentration profile corresponding to the lithium-silicon-oxygen layer deposited in Example 4.

This corresponds to the following picture as shown in FIG. 4: the lithium source takes some time to get to temperature, giving rise to a lithium lag as shown below. The organosilicon source can be turned on and off rapidly, so once it is on the plasma deposits lithium silicate. After turning off the organosilicon source of the Li/Al lithium source continues to supply lithium as the source cools off, resulting in a surface layer of lithium. Upon exposure to atmosphere, the lithium surface layer is converted to lithium carbonate.

The surface topography of the films was also checked by AFM. Average surface roughness was approximately 78.6 nm R.M.S. as measured by AFM over an approximately 36 square micron area (6 micrometers by 6 micrometers). The roughness of the uncoated KBr disk was approximately 1 nm RMS. The increase in roughness of the lithium film is thought to be due oxidation of the lithium surface film in air to yields lithium carbonate.

Example 5

Figure 5:
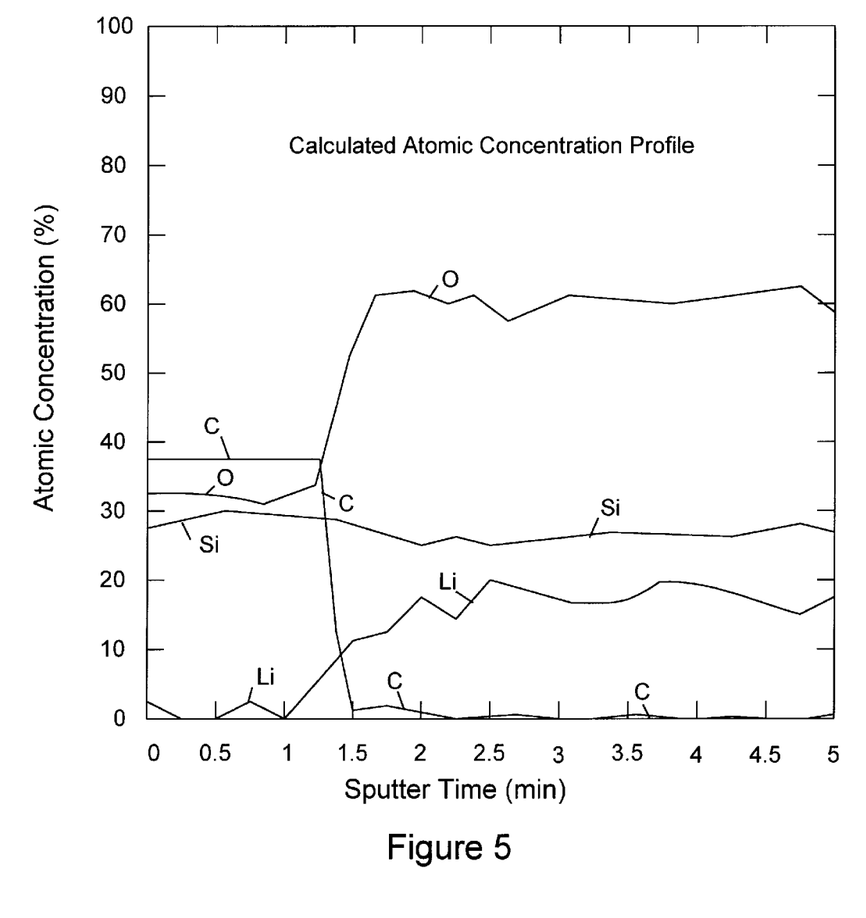
FIG. 5 is a graph of concentration versus film depth for a graded protective film composition in accordance with this invention.

Lithium silicate was deposited as described above onto glass slides with the addition of a capping layer graded from lithium silicate to $SiO_x$. The lithium and silicon sources were run concurrently to deposit a silicate layer of approximately 1000 angstroms in thickness. Then the lithium source was shut off while silicon continued to be introduced to the plasma, thereby grading the layer as the lithium source cooled down. ESCA depth profile analysis showed a composition of the film consistent with a $SiO_x$ capping layer followed by a composition graded from $SiO_x$ to $LiSiO_x$ after which the film was composed of lithium silicate. See FIG. 5. The R.M.S. surface roughness of the glass substrates prior to deposition was approximately 0.748 nm as measured by AFM. The R.M.S. surface roughness of the deposited $LiSiO_x$ film with the $SiO_x$ capping layer was about 0.77 nm as measured by AFM. Therefore it is shown that PECVD can deposit exceptionally smooth lithium containing films which follow the substrate morphology.

Other Embodiments

The foregoing describes the instant invention and its presently preferred embodiments. Numerous modifications and variations in the practice of this invention are expected to occur to those skilled in the art. For example, the invention may provide overcharge protection as described in U.S. patent application Ser. No. 08/686,609, filed Jul. 26, 1996, and entitled RECHARGEABLE POSITIVE ELECTRODES and U.S. patent application Ser. No. 08/782,245, filed Mar. 19, 1997, and entitled OVERCHARGE PROTECTION SYSTEMS FOR RECHARGEABLE BATTERIES. Such modifications and variations are encompassed within the following claims.

All references cited herein are incorporated by reference for all purposes.

What is claimed is:

1. A negative electrode comprising:
   an alkali metal layer having a first surface; and
   a glassy or amorphous protective layer coating the first surface and forming a substantially impervious layer which protects the alkali metal, which protective layer has a surface roughness of no greater than about 500 angstroms r.m.s. deviation;
   wherein the protective layer conducts alkali metal ions.

2. The negative electrode of claim 1, further comprising an electronically conductive backing intimately contacting a second surface of said alkali metal which is opposite the first surface of the alkali metal.

3. The negative electrode of claim 1, wherein the alkali metal comprises at least one of lithium, sodium, alloys of lithium, and alloys of sodium.

4. The negative electrode of claim 1, wherein the protective layer includes at least one of a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide.

5. The negative electrode of claim 4, wherein the protective layer includes at least one of $6LiI-Li_3PO_4-P_2S_5$, $B_2O_3-LiCO_3-Li_3PO_4$, $LiI-Li_2O-SiO_2$, and $Li_xPO_yN_z$.

6. The negative electrode of claim 1, wherein the protective layer has a thickness of between about 50 angstroms and 3000 angstroms.

7. The negative electrode of claim 6, wherein the protective layer has a thickness of between about 500 angstroms and 2000 angstroms.

8. The negative electrode of claim 1, wherein the protective layer has a conductivity of between about $10^{-8}$ and about $10^{-2}$ $(ohm-cm)^{-1}$.

9. The negative electrode of claim 1, wherein the protective layer has a graded composition which varies between the first surface of the alkaline metal and an opposite surface on the protective layer.

10. The negative electrode of claim 9, wherein the protective layer includes lithium nitride, and wherein the concentration of lithium nitride is greater at the first surface of the alkali metal than at the opposite surface of the protective layer.

11. The negative electrode of claim 1, wherein the protective layer has a surface roughness of no greater than about 100 angstroms r.m.s. deviation.

12. The negative electrode of claim 1, wherein the protective layer has an internal stress at most about 50 MPa.

13. The negative electrode of claim 1, wherein the protective layer has an internal stress at most about 10 MPa.

14. A negative electrode comprising:
an alkali metal layer having a first surface; and
a glassy or amorphous protective layer coating the first surface and forming a substantially impervious layer which protects the alkali metal, which protective layer has a variable composition which gradually varies from a first composition to a second composition over a distance of about 50 angstroms in the direction from the first surface of the alkaline metal to an opposite surface on the protective layer;
wherein the protective layer conducts alkali metal ions.

15. The negative electrode of claim 14, wherein the protective layer has a surface roughness of no greater than about 500 angstroms.

16. The negative electrode of claim 14, further comprising an electronically conductive backing intimately contacting a second surface of said alkali metal which is opposite the first surface of the alkali metal.

17. The negative electrode of claim 14, wherein the alkali metal comprises at least one of lithium, sodium, alloys of lithium, and alloys of sodium.

18. The negative electrode of claim 14, wherein the protective layer includes at least one of a lithium silicate, a lithium borate, a lithium aluminate, a lithium phosphate, a lithium phosphorus oxynitride, a lithium silicosulfide, a lithium borosulfide, a lithium aluminosulfide, and a lithium phosphosulfide.

19. The negative electrode of claim 14, wherein the protective layer has a thickness of between about 50 angstroms and 3000 angstroms.

20. The negative electrode of claim 14, wherein the protective layer includes lithium nitride, and wherein the concentration of lithium nitride is greater at the first surface of the alkali metal than at the opposite surface of the protective layer.

21. The negative electrode of claim 14, wherein the protective layer has an internal stress at most about 50 MPa.

22. A negative electrode having an alkaline metal and a glassy amorphous protective layer coating a first surface of the alkali metal wherein the negative electrode is fabricated by a method comprising:
introducing the alkali metal into a reaction chamber;
introducing precursors of the protective layer into the reaction chamber;
generating a plasma with the precursors; and
conducting a reaction involving the precursors to form the glassy amorphous layer on the alkali metal.

23. The method of claim 22, wherein the precursors of the protective layer include the alkali metal or a compound of the alkali metal in a vapor state.

24. The method of claim 22, wherein the alkali metal is introduced into the reaction chamber by heating a source of the alkali metal or a compound containing the alkali metal to vaporize the alkali metal or the compound containing the alkali metal.

25. The method of claim 22, wherein the alkali metal is introduced into the reaction chamber by contacting a source of the alkali metal with the plasma to thereby directly introduce the alkali metal into the plasma.

26. The method of claim 22, wherein the alkali metal is introduced into the reaction chamber by contacting an alloy of the alkali metal with the plasma to thereby introduce the alkali metal into the plasma.

27. The method of claim 26, wherein the alloy of the alkali metal contains lithium and aluminum.

28. The method of claim 22, wherein the composition of the precursors of the protective layer change during the fabrication process, thereby causing a change in the chemical composition of the protective layer between an interface between the protective layer and the alkali metal and an outer surface of the protective layer.

29. The method of claim 22, wherein the protective layer is deposited to a thickness of between about 50 angstroms and 3,000 angstroms.

30. The method of claim 22, wherein the precursors of the protective layer include at least one of an organosilicon compound, an organoboron compound, and an organophosphorus compound.

31. A battery cell comprising:
a) a positive electrode comprising a mixture of
   i) an electrochemically active material, and
   ii) an electronically conductive material,
the mixture having between about 10% and about 100% of the electrochemically active material accessible to electrons and ionic charge carriers;
b) a current collector electrically connected to the positive electrode;
c) a negative electrode including
   i) a metal or metal ion, and
   ii) a protective layer on an electrolyte facing surface of the negative electrode; and
d) an electrolyte separator;
wherein electrochemically active material is selected from the group consisting of elemental sulfur, sulfides of the metal, polysulfides of the metal, and combinations thereof.

32. The battery cell of claim 31, wherein the alkali metal comprises at least one of lithium, sodium, alloys of lithium, and alloys of sodium.

33. The battery cell of claim 31, wherein the protective layer includes at least one of a lithium silicate, a lithium borate, a lithium aluminate, a lithium phosphate, a lithium phosphor nitride, a lithium silicosulfide, a lithium borosulfide, a lithium aluminosulfide, and a lithium phosphosulfide.

34. The battery cell of claim 31, wherein the protective layer has a thickness of between about 50 angstroms and 3000 angstroms.

35. The battery cell of claim 31, wherein the electrolyte separator is a liquid electrolyte separator.

36. The battery cell of claim 31, wherein at least about 20% of the electrochemically active material is accessible to electrons and ionic charge carriers.

37. The battery cell of claim 31, wherein at least about 40% of the electrochemically active material is accessible to electrons and ionic charge carriers.

38. The battery cell of claim 31, wherein the electrolyte separator is a polymer or gel electrolyte separator.

* * * * *